(12) United States Patent
Homison et al.

(10) Patent No.: US 12,228,098 B2
(45) Date of Patent: Feb. 18, 2025

(54) METHOD AND SYSTEMS FOR A GASEOUS FUEL TURBO-COMPRESSOR

(71) Applicant: Transportation IP Holdings, LLC, Norwalk, CT (US)

(72) Inventors: Christopher Homison, Wattsburg, PA (US); Jacob Kenneth Pedder, State College, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 0 days.

(21) Appl. No.: 18/066,907

(22) Filed: Dec. 15, 2022

(65) Prior Publication Data

US 2024/0200515 A1 Jun. 20, 2024

(51) Int. Cl.
*F02M 21/02* (2006.01)
*F02B 37/10* (2006.01)
*F02B 37/18* (2006.01)
*F04B 43/00* (2006.01)

(52) U.S. Cl.
CPC ......... *F02M 21/0245* (2013.01); *F02B 37/10* (2013.01); *F02B 37/18* (2013.01); *F02M 21/0248* (2013.01); *F04B 43/00* (2013.01)

(58) Field of Classification Search
CPC ............... F02M 21/0248; F02M 21/0245; F02B 37/10; F02B 37/18
See application file for complete search history.

(56) References Cited

U.S. PATENT DOCUMENTS

| | | | |
|---|---|---|---|
| 5,899,070 A * | 5/1999 | Droessler | F02B 37/005 60/612 |
| 2017/0107924 A1* | 4/2017 | Blythe | F02D 41/0065 |
| 2019/0078503 A1* | 3/2019 | Klima | F02B 37/007 |
| 2019/0242307 A1* | 8/2019 | Engfehr | F02D 19/0628 |
| 2020/0355111 A1* | 11/2020 | Lusardi | F02B 37/24 |
| 2023/0081493 A1* | 3/2023 | Lavertu | F02B 39/10 60/602 |

* cited by examiner

*Primary Examiner* — Kevin A Lathers
(74) *Attorney, Agent, or Firm* — K&L Gates LLP (57) ABSTRACT

A system is provided for compressing gaseous fuel for injection into an engine. The system includes a turbine positioned in the exhaust passage of an engine and a compressor positioned in a gaseous fuel line upstream of the engine, where the compressor is coupled to the turbine.

18 Claims, 6 Drawing Sheets

METHOD AND SYSTEMS FOR A GASEOUS FUEL TURBO-COMPRESSOR

BACKGROUND

Technical Field

Embodiments of the subject matter disclosed herein relate to a gaseous fuel turbo-compressor system and a method for supplying high-pressure gaseous fuel to a prime mover.

Discussion of Art

Some engines combust gaseous fuel, such as natural gas or hydrogen, whether alone or in combination with a liquid fuel such as diesel, which may lower emissions relative to conventional liquid fueled engines. Direct injection of the gaseous fuel may mitigate some of the drawbacks associated with port injection/admission of the gaseous fuel, such as lower volumetric efficiency. It may be desirable to have a system and a method that differs from those that are currently available.

BRIEF DESCRIPTION

In one embodiment, a system includes a turbine positioned in an exhaust passage of an engine and a compressor coupled to the turbine and positioned in a gaseous fuel line upstream of the engine.

DETAILED DESCRIPTION

Embodiments disclosed in the following description and may relate to methods and systems for a gaseous fuel turbo-compressor and operating an internal combustion engine (ICE) with gaseous fuel compressed by the gaseous fuel turbo-compressor. The gaseous fuel turbo-compressor may include a compressor that pressurizes gaseous fuel to be delivered to the engine and a turbine mechanically coupled to the compressor, where the turbine is positioned in an exhaust passage of the engine. The ICE may operate via combustion of a combination of different fuels as a mixture, and in different proportions relative to each other to form a substitution ratio of one fuel relative to a total amount of fuel consisting of at least two fuel types. The fuels may have different amounts of carbon, and suitable fuels may include one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels, solid fuels, and liquid fuels, alone or in combination.

Figure 1:
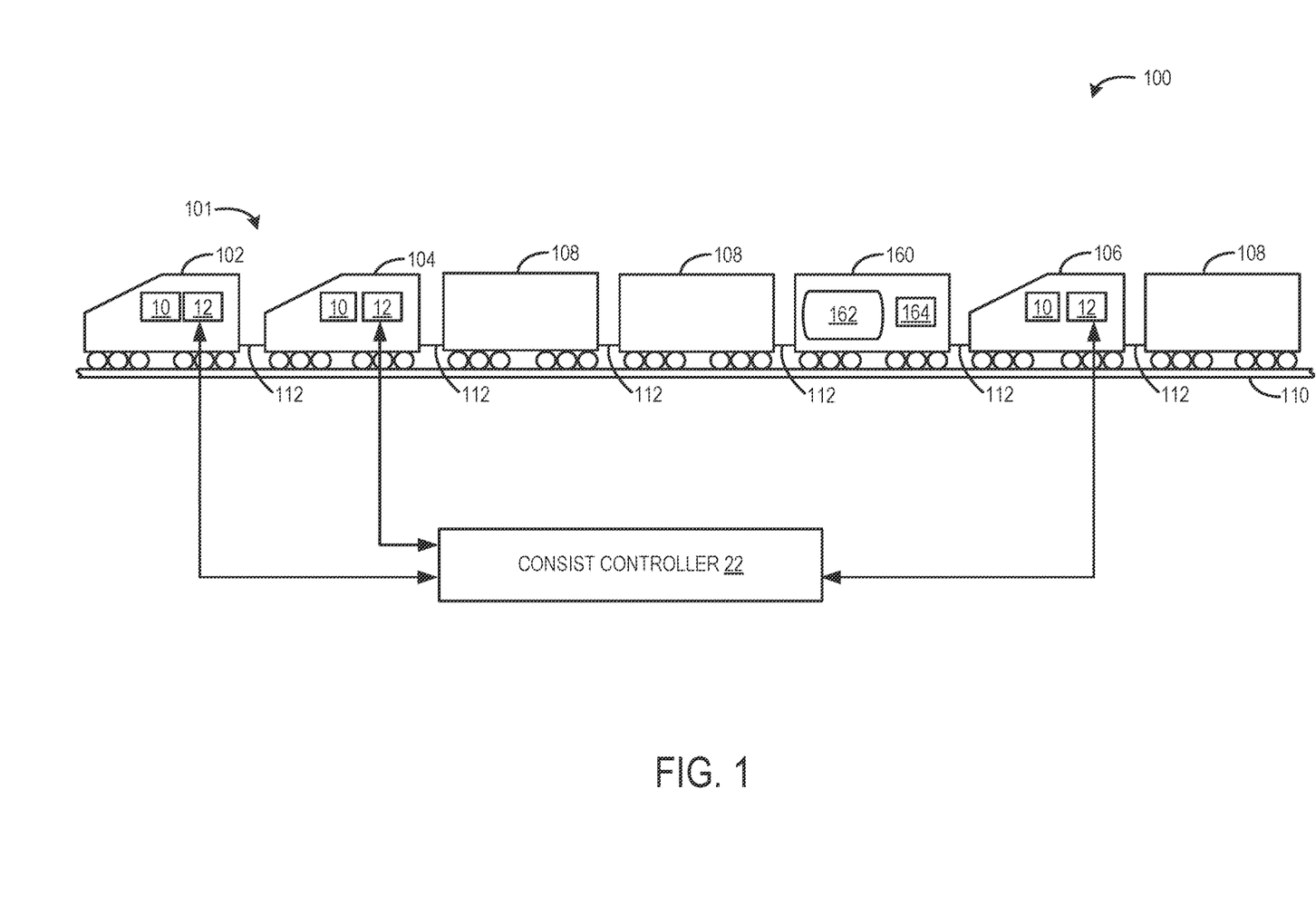
FIG. 1 shows an example embodiment of a train including a locomotive consist.
Figure 2:
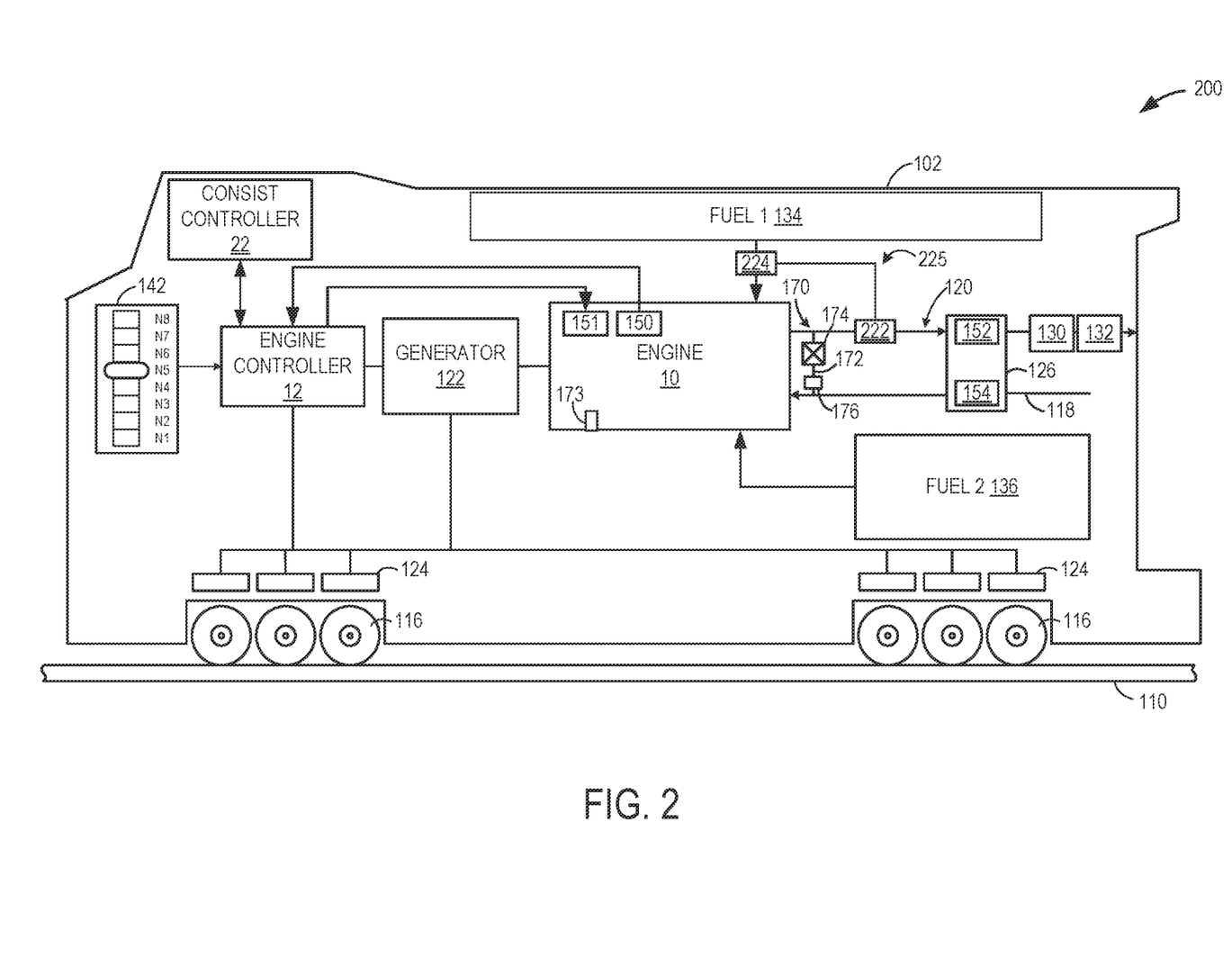
FIG. 2 shows a schematic diagram of an example embodiment of a locomotive from FIG. 1.
Figure 3:
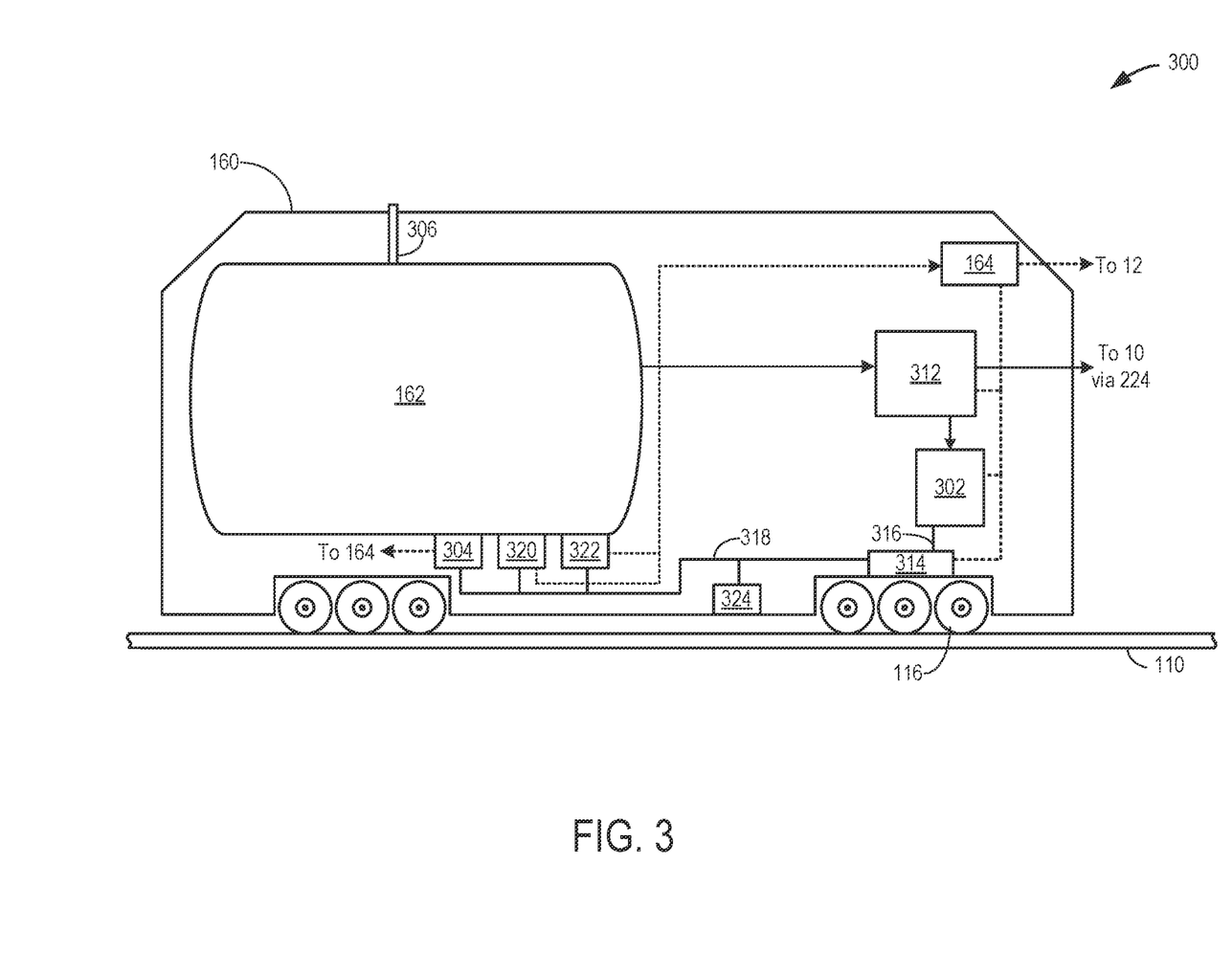
FIG. 3 shows an example embodiment of a fuel tender which may be included in the train of FIG. 1.

The ICE may be a multi-fuel engine or a single-fuel engine positioned in a vehicle. In some examples, the vehicle may be a rail vehicle such as a locomotive, where the locomotive may be one of multiple locomotives in a locomotive consist of a train, as shown in FIG. 1. FIG. 2 shows a schematic diagram of an example embodiment of a locomotive having an engine combusting gaseous fuel compressed via the compressor of the gaseous fuel turbo-compressor, which is shown in more detail in FIG. 4. The train of FIG. 1 may further include a fuel tender for storing at least one fuel which may be used by the engine, an embodiment of which is shown in FIG. 3. The supply of the gaseous fuel to the engine may be controlled according to the example method shown in FIGS. 5A and 5B.

In one embodiment, the engine may be a multi-fuel engine that may combust a first fuel in combination with a second fuel. The multi-fuel engine may combust the first fuel alone, the second fuel alone, or the second fuel as a fuel mixture with the first fuel. During some conditions, the multi-fuel engine may decrease an amount of second fuel used via substituting the first fuel into a combustion mixture. The first fuel may include a reduced carbon-content relative to the second fuel. Additionally or alternatively, the first fuel may be less expensive, more available, and/or more efficient. The second fuel may vary in ignitability and burn rate compared to the first fuel.

The substitution ratio of the second fuel of the ICE with the first fuel may be determined by a controller. The controller may determine the substitution ratio based at least in part on one or more of a current engine load, a current engine temperature, a current manifold temperature, a current injection timing, and a current air-to-fuel ratio. The controller may determine the substitution ratio based at least in part on the fuels used in the mixture, and their associated characteristics. The substitution ratio may be a ratio of the first fuel to a total amount of fuel (e.g., a sum of the first fuel and the second fuel). As the substitution ratio increases, the relative proportion of the first fuel increases relative to the total amount of fuel. In one example, the first fuel may be a fuel with a lower or zero carbon content relative to the second fuel. The substitution ratio may correspond to a percentage of total fuel energy content provided by each of the first fuel and the second fuel. For example, if the desired substitution ratio is 60%, then the first fuel may provide 60% of the total fuel energy content and the second fuel may provide 40% of the total fuel energy content.

In one embodiment, the ICE may combust fuel mixtures that include both diesel and hydrogen. During some operating modes, the ICE may combust only diesel, only hydrogen, or a combination thereof. When hydrogen is provided, operating conditions may be adjusted to account for the hydrogen and to promote enhanced combustion of the hydrogen. For example, adjusting operating conditions may include increasing an amount of air to be combusted with the fuel mixture of hydrogen and diesel such that airflow is increased, thus slowing a rate of combustion with hydrogen and allowing for a higher substitution ratio. Furthermore, increasing the substitution ratio may leverage a wide flammability range of hydrogen, e.g., relative to diesel, allowing engine performance to be increased under lean combustion. Further operating conditions may be adjusted such that hydrogen is combusted preferentially to diesel, where diesel combustion is reduced.

In another embodiment, ammonia may be provided in addition to or as an alternative fuel source for hydrogen. When ammonia is provided, operating conditions may be adjusted to account for the ammonia and to promote enhanced combustion of the ammonia. Adjustment of operating conditions to account for ammonia may be similar to or different from adjustments of operating conditions to account for hydrogen. For example, an air-to-fuel ratio (AFR) may be increased or decreased during adjustment of an ammonia to diesel ratio. Further details of AFR adjustment with regards to ammonia injection are beyond the scope of the present disclosure.

When the engine is operating in a diesel mode (e.g., only diesel is injected and burned), an AFR combusted at the engine may be selected to allow the diesel to fully combust, may decrease emissions, and may increase engine combustion efficiency. However, when operating in a multi-fuel mode (e.g., more than one fuel type is injected and burned), the AFR may be increased to reduce auto-ignition and knocking tendencies.

Adjustments to engine operating conditions that allow for increased substitution ratio, such as increasing the AFR, may benefit the multi-fuel engine. For example, combustion conditions which may be established by increasing the AFR may result in an increase in power output and a decrease in emissions. Other embodiments may include substitution ratios including natural gas, alcohol and ammonia, as well as other type of fuels. Certain fuels (e.g., ammonia) may rely on different adjustments (e.g., increase or decrease in AFR) to increase an amount of fuel vaporization and combustion.

In some examples, gaseous fuel (such as hydrogen or natural gas) may be directly injected into the engine cylinders. Direct injection of the gaseous fuel may provide a higher level of precision over the amount of fuel being injected, more control over the timing of the injection, and more power to the engine. Under certain conditions, direct injection of the gaseous fuel may demand the hydrogen to be compressed above a storage pressure. Due to the physics of the gaseous fuel, the energy used to compress the hydrogen may reduce the overall fuel efficiency of the engine. The reduction in engine efficiency may be reduced by utilizing waste heat from the engine to supply energy to the compression process via the gaseous fuel turbo-compressor. Waste heat in the engine exhaust may drive a turbine of the gaseous fuel turbo-compressor, which is coupled to a mechanical compressor for compressing the gaseous fuel. Such a turbo-compressor system may enable the compression work of the gaseous fuel to be carried out in a way that has significantly less or no effect on the overall efficiency of the engine.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles, and other off-highway vehicles (OHV). Suitable on-road vehicles can include automobiles, buses, and semi-trucks. Suitable off road vehicles can include mining equipment, marine vessels, rail vehicles, agricultural vehicles, and the like. For clarity of illustration, a rail vehicle such as a locomotive is used as an example of a mobile platform. Suitable systems may include an engine, a turbocharger, a fuel system, and a controller or control system. Some embodiments may include an aftertreatment system or other emission reduction system. The vehicles can operate singly or may move as a group. A vehicle group may be coupled together mechanically (as in a consist) and/or virtually (as in a platoon or swarm) to coordinate their movements.

An example platform in which the systems and methods may be implemented is shown in FIG. 1. An example train 100 is shown, to include a plurality of rail vehicles 102, 104, 106, a fuel tender 160, and cars 108, that can run on a track 110. The plurality of rail vehicles, the fuel tender, and the cars are coupled to each other through couplers 112. In one embodiment, the plurality of rail vehicles may be locomotives, including a lead locomotive and one or more remote locomotives. The locomotives in the train may form a consist. For example, in the embodiment depicted, the locomotives may form a consist 101. As illustrated, the train includes one consist. Various vehicles may form vehicle groups (such as consists, convoys, swarms, fleets, platoons, and the like). The vehicles in a group may be coupled together mechanically and/or virtually. Throttle and braking commands may be relayed from the lead locomotive to the remote locomotives by a radio link or physical cable, for example.

The locomotives may be powered by an engine 10, while the cars may be un-powered. In the illustrated embodiment, the engine is a multi-fuel engine and may combust gaseous and/or liquid fuels or fuels with differing amounts of carbon content, and may do so in varying ratios of one fuel to another (e.g., the substitution ratio). In some embodiments, the multi-fuel engine may be specifically a dual-fuel engine to combust two fuels, either of which may be a gaseous or liquid fuel that is hydrocarbon or non-hydrocarbon based. In other embodiments, the engine may be a single fuel engine that can combust a gaseous or a liquid fuel.

The train may include a control system. The control system may include an engine controller 12 and it may include a consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly. The consist controller may be coupled to each engine controller for adjusting engine operations of each locomotive.

Each engine controller may determine a current engine condition and adjust an AFR thereof. Settings for at least one of turbocharger wastegate position, injection timing, and substitution ratio may be adjusted to adjust the AFR. The aforementioned settings may be adjusted based on one or more of barometric pressure, ambient temperature, humidity, engine speed, engine power, manifold air temperature, and manifold air pressure. As described above, the substitution ratio corresponds to a substitution of a second fuel with a first fuel. The engine may combust the second fuel alone in one operating mode. However, in other operating modes the engine may perform multi-fuel combustion. The switch of operating modes may be done, for example, to decrease one or more emission types, decrease combustion costs, increase engine efficiency, accommodate a low availability of one or more fuels, and the like. The first fuel and the second fuels may be selected from gasoline, diesel, alcohol(s), ethers, ammonia, hydrogen, natural gas, kerosene, syn-gas, biodiesel, cryogenic liquids, and the like. Suitable diesel fuel may include regular diesel, hydrogenation-derived renewable diesel (HDRD), and biodiesel. In one embodiment, the propulsion system may be augmented with a fuel cell and/or an energy storage device that accepts and/or provides electrical energy to traction motors. In the herein described embodiment, the second fuel is diesel and the first fuel is hydrogen or natural gas.

The train may include at least one fuel tender, which may carry one or more fuel storage tanks 162 and includes a controller 164. While the fuel tender may be positioned in front of the remote locomotive 106, in other examples it may be in other locations along the train.

In one embodiment, the fuel tender may be un-powered, e.g., without an engine or electric traction motors (e.g., electric traction motors 124 shown in FIG. 2). However, in other embodiments, the fuel tender may be powered for propulsion. For example, as shown in FIG. 3, the fuel tender may include an engine 302. The engine of the fuel tender may combust the fuel stored in the fuel storage tank and/or fuel stored at another vehicle of the train.

The one or more fuel storage tanks of the fuel tender may have a structure suitable for storing a specific type of fuel. In one embodiment, the fuel storage tank may be adapted for cryogenic storage of liquefied natural gas (LNG). As another embodiment, the fuel storage tank may store a fuel in a liquid state at ambient temperature and pressure, such as diesel or ammonia. In yet another embodiment, the fuel storage tank may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may have a fuel cell system. The fuel cell system may include a fuel cell and one or more tanks of hydrogen.

FIG. 2 depicts an example embodiment 200 of a locomotive as part of a train that may run on a track 110 via a plurality of wheels 116. Power for propulsion of the locomotive may be supplied at least in part by the engine. The engine may receive intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine which may combust at least one type of fuel. The compression ignition engine may further combust fuel according to a variety of methods. More specifically, the compression ignition engine may leverage combustion strategies for decreasing combustion temperature, which may enable NOx and particulate matter emissions to be decreased. For example, when the AFR is greater than a first air-to-fuel threshold and a substitution ratio is greater than a first substitution threshold, the engine may burn fuel via homogeneous charge compression ignition (HCCI), where a well-mixed fuel and an oxidizer (e.g., air) may be compressed to auto-ignite. As such, lean mixtures may be combusted, further suppressing NOx formation. As another example, the multi-fuel engine may burn fuel via premixed charge compression ignition (PCCI) when the AFR is less than a second air-to-fuel threshold and the substitution ratio is less than a second substitution threshold. The first air-fuel threshold may be greater than the second air-fuel threshold (e.g., an amount of air at the first air-fuel threshold is greater than an amount of air at the second AFR). The first substitution threshold is greater than the second substitution threshold (e.g., an amount of first fuel at the first substitution threshold is greater than an amount of fuel at the second substitution threshold). Combustion using PCCI may be similar to combustion with HCCI, but may have an increased engine operating range, propensity for knock, and control over combustion parameters. When utilizing PCCI for combustion, a fuel/air mixture may be not entirely homogeneous. This may allow the fuel to be injected through advanced direct injection, late direction injection and port injection. As a result, fuel injection may be completed before combustion begins, thereby decreasing particulate matter while allowing exhaust gas recirculation (EGR) flow to decrease NOx emissions.

In another embodiment, the engine operates as a spark ignition engine. The engine, as either the compression ignition engine or the spark ignition engine, may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine. As depicted in FIG. 2, the dual fuel engine may receive a first fuel from a first fuel reservoir 134 and a second fuel from a second fuel reservoir 136.

While the locomotive is equipped with two fuel reservoirs in FIG. 2, in other embodiments, the locomotive may include only one fuel reservoir or no fuel reservoir. For example, at least one of the fuel reservoirs may be stored at the fuel tender, e.g., the fuel tender of FIG. 1. Alternatively, at least one additional fuel, e.g., a third fuel, may be stored at the fuel tender in addition to the first fuel at the first fuel reservoir and the second fuel at the second fuel reservoir of the locomotive. In one embodiment, fuels which may be stored at ambient pressure and temperature without any additional equipment or specialized storage tank configurations may be stored at the locomotive. Fuels demanding specialized equipment, such as for cryogenic or high pressure storage, may be stored on-board the fuel tender. In other embodiments, however, the locomotive and the fuel tender may each store fuels that do not demand specialized equipment.

The first and second fuels (e.g., any fuels stored on-board the train) may each be any of a number of different fuel types. For example, the types of fuel may include hydrocarbon-based fuels, such as diesel, natural gas, methanol, ethanol, dimethyl ether (DME), and so on. Alternatively, the fuels may be non-hydrocarbon-based fuels, such as hydrogen, ammonia, and so on. The fuels listed above are non-limiting examples of fuels which may be combusted at the engine and various other types of fuels are possible.

Additionally, each of the stored fuels may be a gaseous or a liquid phase fuel. Thus, when a compression ignition engine is combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when a spark ignition engine combusts a single fuel type, the engine may consume either or both of a gaseous fuel and a liquid fuel. A multi-fuel spark ignition engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a first combustion fuel and another fuel type may be a second, additive fuel used under certain conditions to adjust combustion characteristics. For example, during engine startup, a fuel combustion mixture may include a smaller proportion of diesel to seed ignition while hydrogen may form a larger proportion of the mixture. In other embodiments, one fuel may be used for pilot injection prior to injection of the first combustion fuel. In some embodiments, the substitution ratio may be set based on one or more conditions to increase an amount of carbon-free fuel to decrease carbon emissions. A ratio of carbon-free fuel used may be adjusted based on desired ignition timing, where the desired ignition timing is based on one or more of an engine load, an intake manifold temperature and pressure, and an ignitability of the fuel mixture, as further described herein.

The engine, as the multi-fuel engine, may combust various combinations of the fuels and the fuels may be premixed or not premixed prior to combustion. In one example, the first fuel and the second fuel may be individually introduced to the cylinder, which may contain air to be combusted with the fuel. Each of the first fuel and the second fuel may mix with air at a different rate. For example, the first fuel may mix with air more than with the second fuel. Thus, in one example, mixing an amount of the first fuel and an amount of the second fuel to combust a fuel mixture having a determined fuel ratio of the first fuel relative to the second fuel may include mixing the first fuel and the second fuel in the cylinder.

In one embodiment, the first fuel may be hydrogen and the second fuel may be diesel. In another embodiment, the first fuel may be ammonia and the second fuel may be diesel. In a still further embodiment, the first fuel may be natural gas and the second fuel may be diesel. Further combinations are possible with storage of a third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When the engine is the single fuel-combusting engine (either spark ignition or compression ignition), the engine may consume a single liquid phase fuel. For example, the engine may combust diesel, hydrogen, ammonia, LNG, or another liquid phase fuel. Similarly, the engine may combust a single gaseous fuel, such as hydrogen, or another gaseous fuel.

A fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one embodiment, one or more of the fuels may be delivered to the engine cylinders via an indirect injection method, such as port injection. In another embodiment, at least one of the fuels may be introduced to the engine cylinders via direct injection. In yet another embodiment, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing of the gaseous fuel may be desirable via port injection. The fuels may be premixed when introduced by central manifold injection. Premixing by direct injection is possible, such as by injection of the gaseous fuel during an intake stroke of the engine cylinders. Additionally or alternatively, a location of injection of one or more fuels may be based on a combustibility of a fuel. For example, ammonia may be injected indirectly and premixed with charged air and/or EGR to enhance the combustibility and vaporization thereof. In another example, as described above, the first fuel and the second fuel may be independently injected into the cylinder and thus independently mix with air in the cylinder and with the other injected fuel (e.g., the first fuel or the second fuel).

During operation, each cylinder within the engine may use a four stroke cycle via actuation of the piston along an axis. The cycle includes the intake stroke, compression stroke, expansion stroke, and exhaust stroke. During the intake stroke, the exhaust valve may close and the intake valve may open. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is referred to as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is referred to by those of skill in the art as top dead center (TDC). In a process hereinafter referred to as direct injection, fuel is introduced into the combustion chamber. In some embodiments, fuel may be injected to the cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that injection timing may vary, such as to advance or delay injection timing to decrease emissions. For example, injection timing may be based on a position of the piston during the engine cycle and may be desired near TDC of the compression stroke. A more advanced injection timing may include where the injection timing is moved prior to TDC of the compression stroke and a delayed injection timing may include where the injection timing is moved after TDC of the compression stroke. In some embodiments, nominal injection timing may occur after TDC of the compression stroke (e.g., at the start of the expansion stroke) and delayed injection timing may occur as the piston approaches BDC during the expansion stroke. Further, in some examples, a two-stroke cycle may be used rather than a four-stroke cycle.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be selectively injected by port injection or direct injection. Similarly, fuels such as methanol and ethanol may be either port injected or direct injected. In some instances, the engine may have fuel injectors capable of switching between injection of gaseous fuels and of liquid fuels.

The fuels combusted by the dual fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other embodiments, the fuel(s) may be injected into a pre-combustion chamber fluidically coupled to a cylinder head where each of the first fuel and the second fuel may independently mix with air and with each other in the pre-combustion chamber before flowing to the cylinder head. Further, the first fuel and the second fuel may be independently injected into the cylinder head and independently mix with air and with each other.

A substitution ratio of the fuels for co-combustion may vary according to operating conditions. For example, when the first fuel is hydrogen and the second fuel is diesel, a hydrogen-diesel ratio may be decreased in response to an increase in power demand at the engine. In some instances, the ratio may be adjusted such that only one of the fuels is combusted at the engine. The substitution ratio may vary according to the AFR such that, when the AFR is adjusted via adjustment of operating parameters, the substitution ratio may be increased to a maximum substitution ratio (e.g., a maximum amount of hydrogen combusted with diesel). In one embodiment, the maximum substitution ratio may be an amount of hydrogen (e.g., substituted for diesel) above which desired engine power may not be attained. In another embodiment, the maximum substitution ratio may be an amount of hydrogen above which engine knock occurs or a likelihood of engine knock is increased above a knock threshold.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels to provide tractive power to propel the locomotive. One embodiment of a locomotive configuration includes one traction motor per wheel. As depicted herein, six pairs of traction motors correspond to each of six pairs of wheels of the locomotive.

The engine may have one or more turbochargers 126 arranged between the intake passage and the exhaust passage. The turbocharger charges ambient air drawn into the intake passage to provide greater charge density (e.g., to increase an amount of charged air) during combustion to increase power output and/or engine-operating efficiency. The turbocharger may include a second compressor 154 which is at least partially driven by a second turbine 152. While in this case a single turbocharger is included, the system may include multiple turbine and/or compressor stages. In one example, the turbocharger may be a variable geometry turbocharger. As such, an aspect ratio of the turbocharger may be varied according to operating conditions, thereby increasing efficiency at high engine speeds and reducing turbo lag. In some embodiments, an e-turbo may be included. The e-turbo may be an electric motor, coupled to a shaft of the turbocharger, which may extract excess exhaust energy from the turbocharger and/or motor the compressor to increase air flow. Where the e-turbo is present, the controller may use the e-turbo to control the second turbine speed by adding torque at the cost of electricity or by dynamically braking the system with the e-turbo motor to generate electricity.

The engine may have an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). Adjusting the amount of exhaust gas recirculated thus adjusts an oxidant content available for combustion. The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The engine system may further include multiple methods of providing EGR. Herein, EGR is defined as an exhaust gas from a previous cycle retained or reingested by one or more cylinders for a subsequent combustion event. EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. Additionally or alternatively, the donor cylinder may expel exhaust gases directly to the EGR passage, thus adjusting an oxidant content available for combustion. The adjusted exhaust valve timing may include where an exhaust valve opening may overlap with an intake valve opening, resulting in a vacuum of the cylinder drawing expelled exhaust gases back into the cylinder. The EGR rate may be set via the donor cylinder(s), the adjusted exhaust valve timing, and/or valve position in the EGR passage. For example, adjusting valve timing may include changing a timing of opening/closing the intake and exhaust valves at the engine relative to cylinder cycle.

The engine may have a gaseous fuel turbo-compressor 225 comprised of a first turbine 222 and a first compressor 224, where the first turbine is coupled to the first compressor via a shaft or other mechanical coupling mechanism. The first turbine may at least in part drive the first compressor. The first turbine may be positioned in a suitable location to be driven by the exhaust gas from the engine, such as within the exhaust passage. As depicted in the non-limiting example embodiment of FIG. 2, the first turbine may be positioned upstream (e.g., exhaust gas reaches the turbine first) in the exhaust passage relative to the second turbine of the turbocharger as the power requirement for the first compressor may be larger than the power requirement of the second compressor. However, in other examples, the first turbine may be downstream of the second turbine. The first turbine may be positioned downstream (e.g., exhaust gas reaches the turbine second) in the exhaust passage relative to the EGR system. In this way, during at least some conditions, the first turbine may increase the backpressure of the exhaust and thereby reduce throttling of the donor cylinder exhaust. In some examples, the first turbine may be in series with the second turbine and the EGR system within the exhaust passage. As such, the EGR system may utilize energy in the exhaust gas before the exhaust gas reaches the first turbine, which may affect the amount of exhaust energy available to drive the first compressor and compress the gaseous fuel. Accordingly, in some examples, control of the gaseous fuel turbo-compressor may be adjusted based on an amount of EGR flowing to the engine, as will be described in more detail below. In other examples, the first turbine may be in parallel with the second turbine and the EGR system within the exhaust passage.

The first turbine may be a variable turbine so that the turbine speed/power, and therefore compressor work, may be regulated. In some examples, the first turbine may be a variable geometry turbine. As such, an aspect ratio of the first turbine may be varied according to operating conditions, thereby increasing efficiency at high engine speeds and reducing turbine-compressor lag. In some examples, the first turbine may be oversized and may generate excess power relative to the desired compressor work. The system may include an alternator or generator to extract excess power from the oversized first turbine. In some examples, the power generated by the first turbine may be provide energy to another component or system within the vehicle (e.g., turbo-compounding, driving auxiliaries).

The first compressor may be positioned in a gaseous fuel line between the first fuel reservoir and the engine, such that gaseous fuel may flow through the first compressor before reaching the engine in order to increase the pressure of the fuel. As the first turbine drives the first compressor, fuel in the first fuel reservoir (e.g., a gaseous fuel tank) may be drawn into the first compressor. The gaseous fuel pressure of the fuel in the first fuel reservoir may be a first pressure. The first compressor may compress the fuel from the first pressure to a second pressure, where the second pressure is higher than the first pressure, before the fuel is delivered to the engine. In some examples, the first compressor may be a mechanical compressor (e.g., reciprocating piston, diaphragm, linear, liquid piston/rotary, or centrifugal compressor). As such, the compression work may be carried out in a way that has significantly less or no effect on the overall efficiency of the engine. In other examples, the first compressor may be non-mechanical (e.g., cryogenic, metal hydride, electrochemical, adsorption). In some examples, the first compressor may be powered by waste energy from a process or system other than the engine exhaust and the first turbine (e.g., dynamic braking, geothermal, solar, battery storage, cooling system).

The locomotive may include an exhaust gas treatment system coupled in the exhaust passage to reduce controlled emissions. In one embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, known as particulate matter (an example of which is soot), produced during combustion. Suitable DOCs can be made from ceramic or cermet. Suitable material may be alumina or silicon carbide. In other embodiments, the exhaust gas treatment system may additionally include a selective catalytic reduction (SCR) catalyst, three-way catalyst, NOx trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may include a throttle 142 coupled to the engine to indicate power levels. In this embodiment, the throttle may have a plurality of notches. Each notch may correspond to a determined discrete power level, such as a known peak efficiency operating point. The power level indicates an amount of load, or engine output, placed on the locomotive and controls the speed at which the locomotive will travel. Although eight notch settings are depicted in the embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 150, as further elaborated herein, to determine operating parameters and operating conditions, and correspondingly adjust various engine actuators 151 to control operation of the locomotive. For example, the engine controller may receive signals from various engine sensors including, but not limited to, engine speed, engine load, intake manifold air pressure, charged air pressure, exhaust pressure, ambient pressure, ambient temperature, exhaust temperature, engine temperature, exhaust oxygen levels, and so on. The engine sensors may include one or more knock sensors 173 coupled to combustion chambers of the engine. The knock sensors may detect vibrations and sound from the combustion chambers and convert the vibrations and sound into electronic signals that are relayed to the engine controller. Correspondingly, the engine controller may control the locomotive by sending commands to various components such as the electric traction motors, the alternator/generator, cylinder valves, fuel injectors, the notch throttle, and so on. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, and so on. Various other sensors may be coupled to various locations in the locomotive. The control signal portion may generate control signals to trigger various locomotive actuators. Example locomotive actuators may include air brakes, brake air compressor, traction motors, and so on. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, and so on. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Turning now to FIG. 3, an embodiment 300 of the fuel tender of FIG. 1 is shown. As described above, the fuel tender includes the fuel storage tank, the controller, and an engine 302. The fuel tender may further include a first unit 304, which may be a device for controlling a temperature and pressure within the fuel storage tank. For example, when LNG is stored in the fuel storage tank, the first unit may be a cryogenic unit. The size and/or configuration of the fuel storage tank may be selected based on end use parameters.

Further, the fuel storage tank may be removable from the fuel tender, and may receive fuel from an external refueling station via a port 306.

The fuel storage tank may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives. In some examples, the fuel may be delivered from the fuel modification unit to the engine via the first compressor, such that the modified fuel downstream of the fuel modification unit may be compressed by the first compressor.

By supplying fuel from the fuel storage tank to the engines, the fuel may be combusted by the engines distributed across the train. In another non-limiting embodiment, the fuel tender engine may generate electricity that may be delivered to one or more components on-board the fuel tender and/or on-board the locomotives. In one embodiment, as depicted in FIG. 3, the fuel tender engine may generate torque that is transmitted to a power conversion unit 314 via a drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, one or more batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one embodiment the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one embodiment, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one embodiment, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives.

The fuel tender depicted in FIG. 3 is a non-limiting embodiment of the fuel tender. In other embodiments, the fuel tender may include additional or alternative components. As an example, the fuel tender may further include one or more additional sensors, flow meters, control valves, various other device and mechanisms for controlling fuel delivery and storage conditions, and so on.

Figure 4:
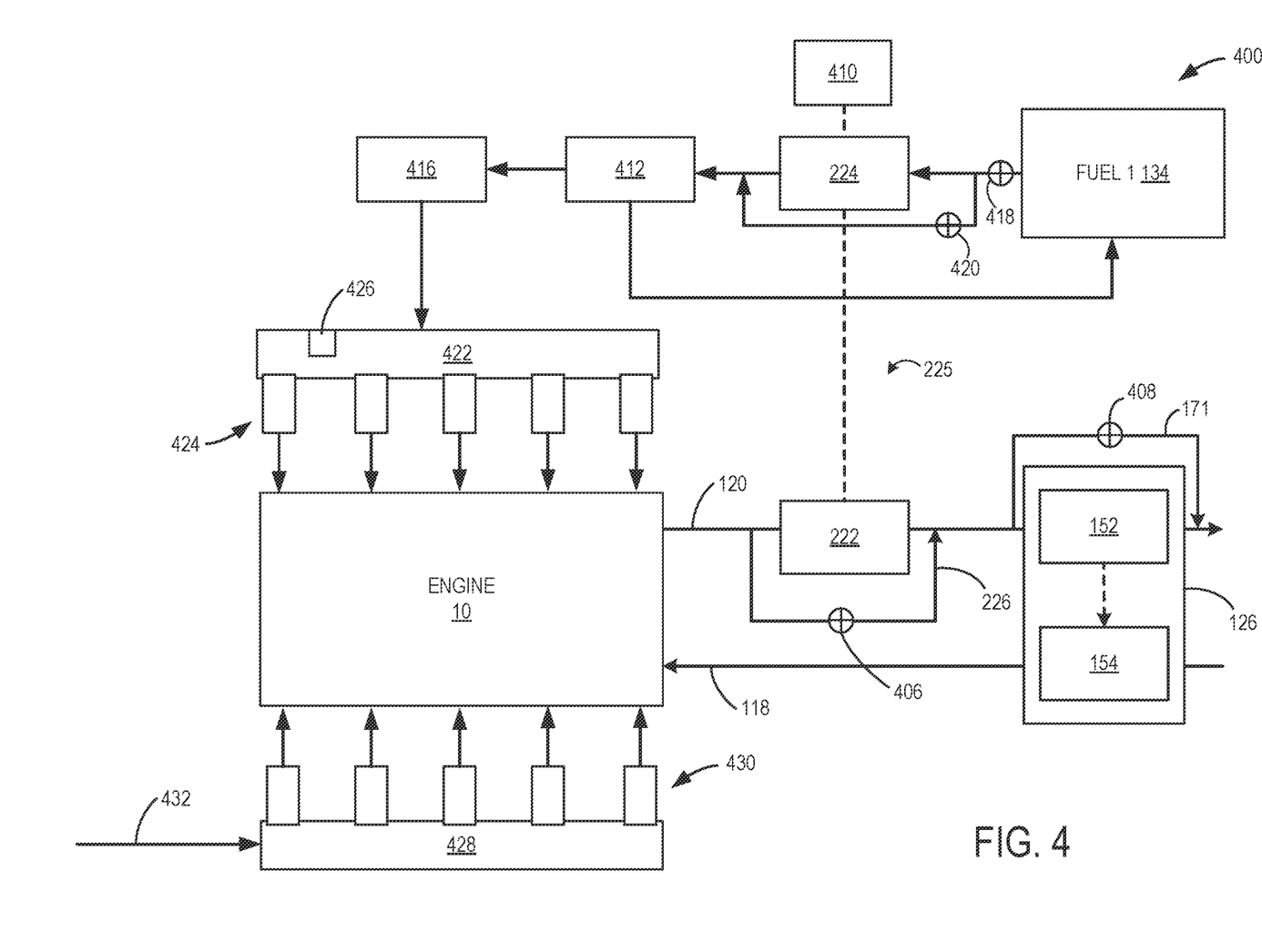
FIG. 4 shows a schematic diagram of an example embodiment of a gaseous fuel turbo-compressor system which may compress gaseous fuel.

Turning now to FIG. 4, an embodiment 400 of the gaseous fuel turbo-compressor system of FIG. 2 is shown. As described above, the system may include the first fuel reservoir, the first turbine, the first compressor, the turbocharger, the intake passage, and the exhaust passage. The first turbine may be positioned within the exhaust passage where exhaust from the engine may drive the first turbine. The first compressor may be positioned in the fuel line running from the first fuel reservoir where it may draw in and compress the gaseous fuel. The first turbine may at least in part drive the first compressor, providing power for the first compressor to compress the gaseous fuel. The turbocharger may be positioned downstream of the first turbine in the exhaust passage. The turbocharger may include the second turbine, positioned in the exhaust passage, and the second compressor, positioned in the intake passage. The second compressor may be positioned upstream of the engine within the intake passage. While in this case a single gaseous fuel turbo-compressor and a single turbocharger are included, the system may include multiple turbo-compressor and/or turbocharger stages.

The system may further include a first bypass passage 226, a first wastegate valve 406, a second bypass passage 171, and a second wastegate valve 408. The first bypass passage may couple to the exhaust passage at an inlet of the first bypass passage upstream of the first turbine in the exhaust passage and may couple to the exhaust passage at an outlet of the first bypass passage downstream of the first turbine in the exhaust passage. The first wastegate valve may be positioned within the first bypass passage in order to regulate the amount of exhaust that may pass through the first bypass passage. As such, the first wastegate valve may allow exhaust gas to bypass the first turbine through the first bypass passage. The first wastegate valve may be opened, for example, to divert the exhaust gas flow away from the first turbine. In this manner, the rotating speed of the first compressor, and thus the compression provided by the first compressor to the gaseous fuel, may be controlled. When the first turbine is a variable geometry turbocharger, adjustment of the first turbine geometry may be coordinated with opening/closing of the first wastegate valve to achieve a desired effect on pressurized gaseous fuel supply to the engine.

The second bypass passage may couple to the exhaust passage at an inlet of the second bypass passage upstream of the second turbine in the exhaust passage and downstream of the first bypass passage in the exhaust passage. The second bypass passage may couple to the exhaust passage at an outlet of the second bypass passage downstream of the second turbine in the exhaust passage. The second wastegate valve may be positioned within the second bypass passage in order to regulate the amount of exhaust that may pass through the second bypass passage. As such, the second wastegate valve may allow exhaust gas to bypass the turbocharger through the second bypass passage. The second wastegate valve may be opened, for example, to divert the exhaust gas flow away from the second turbine. In this manner, the rotating speed of the second compressor, and thus the boost provided by the turbocharger to the engine, may be controlled. When the turbocharger is the variable geometry turbocharger, adjustment of the turbine geometry may be coordinated with opening/closing of the wastegate to achieve a desired effect on charge air supply to the engine. The first wastegate valve and the second wastegate valve may be controlled by the engine controller in response to one or more engine operating conditions.

The system may further include an electric motor 410, a pressure regulator 412, a cooler 416, an inlet metering valve 418, and a compressor bypass valve 420. The electric motor may be electrically coupled to the first compressor. During some conditions, the first compressor may be driven at least in part by the electric motor, or another power source such as the engine crankshaft or engine clutch mechanism. For example, lower amounts of exhaust may move through the exhaust passage immediately after the engine has started up or when the vehicle is idling. As such, an insufficient amount of waste heat in the exhaust may be available to produce the turbine power demanded to drive the first compressor to compress the gaseous fuel to the desired pressure. In such examples, the first compressor may be operated via the electric motor. The electric motor may drive the first compressor until sufficient exhaust flow is present to drive the first turbine. The electric motor may be supplied electricity in order to control the speed of the first compressor. In other examples, the electric motor may be supplied an electrical load to control the speed of the first compressor. In some examples, high-pressure gaseous fuel injection may not be demanded and the engine may be supplied gaseous fuel at a lower pressure, such that the pressure of the fuel in the first fuel reservoir may be sufficient to enable injection of the gaseous fuel. As such, the compressor bypass valve may be opened to allow fuel to bypass the first compressor and flow from the first fuel reservoir into the pressure regulator. The compressor bypass valve may be positioned in a bypass passage that may couple at an inlet side to the gaseous fuel line downstream of the first fuel reservoir and upstream of the first compressor and that may couple at an outlet side to the gaseous fuel line downstream of the first compressor and upstream of the pressure regulator. The compressor bypass valve may be controlled by the engine controller based on engine operating conditions such as engine load and/or fuel substitution ratio.

The inlet metering valve may be positioned downstream of the first fuel reservoir and upstream of the first compressor in the gaseous fuel line. As such, the inlet metering valve may regulate the amount of gaseous fuel that flows from the first fuel reservoir into and/or around the first compressor. The inlet metering valve may be controlled by the engine controller based on engine operating conditions.

The pressure regulator may be downstream of the first compressor in the gaseous fuel line. In some examples, the first compressor may compress the gaseous fuel to a pressure that is higher than the desired pressure for direct injection into the cylinders of the engine. As such, the pressure regulator may direct gaseous fuel back to the first fuel reservoir in order to reduce the pressure of the gaseous fuel before injection to the engine. As the first compressor compresses the gaseous fuel, the gaseous fuel may increase in temperature. As such, the cooler may reduce the temperature of the gaseous fuel to a desired temperature. In some example, the high-pressure gaseous fuel may be cooled to a temperature that is desirable for injection into the engine. In some examples, the cooler may be downstream of the pressure regulator in the gaseous fuel line. In other examples, the cooler may be upstream of the pressure regulator in the gaseous fuel line. In still further examples, the cooler may be positioned upstream of the compressor, or upstream of the engine. In some examples, the cooler may be positioned immediately upstream of the compressor (with no intervening components between the cooler and the compressor) or the cooler may be positioned immediately upstream of the engine (with no intervening components between the cooler and the gaseous fuel rail).

The system may further include a first fuel rail 422, a plurality of gaseous fuel injectors 424, a first fuel rail pressure sensor 426, a second fuel rail 428, a plurality of liquid fuel injectors 430, and a second fuel line 432. The first fuel rail may be positioned downstream of the first compressor, the pressure regulator, and the cooler in the gaseous fuel line. The first fuel rail may be positioned upstream of the engine in the gaseous fuel line, such that the high-pressure gaseous fuel may pass through the first fuel rail before reaching the engine. The first fuel rail may supply gaseous fuel at a target pressure to one or more gaseous fuel injectors in the plurality of gaseous fuel injectors. Each gaseous fuel injector of the plurality of gaseous fuel injectors may inject the pressurized gaseous fuel directly into a respective cylinder of the engine. While the plurality of gaseous fuel injectors is illustrated to include five gaseous fuel injectors, the plurality of gaseous fuel injectors may include any other number of gaseous fuel injectors corresponding to the number of cylinders of the engine (e.g., 8, 12, 16, etc.). The first fuel rail may include the first fuel rail pressure sensor to monitor the gaseous fuel pressure in the first fuel rail. The output from the first fuel rail pressure sensor may be sent to the controller.

The second fuel rail is similar to the first fuel rail except that the second fuel rail may be used to store pressurized second (e.g., liquid) fuel instead of pressurized gaseous fuel. The first compressor may not compress the pressurized liquid fuel. Instead, a high pressure pump may compress the liquid fuel to a desired pressure. The pressurized liquid fuel may be pumped into the second fuel rail from the second fuel line via a high-pressure pump driven by the engine, for example. The second fuel rail may store the pressurized liquid fuel before the liquid fuel is injected into the engine. Each injector of the plurality of liquid fuel injectors may be used to inject the liquid fuel directly into a respective cylinder of the engine. While the plurality of liquid fuel injectors is illustrated to include five fuel injectors, the plurality of liquid fuel injectors may include any other number of fuel injectors corresponding to the number of cylinders of the engine. The second fuel rail may include one or more pressure sensors to monitor the pressure of the liquid fuel in the second fuel rail.

Figure 5A:
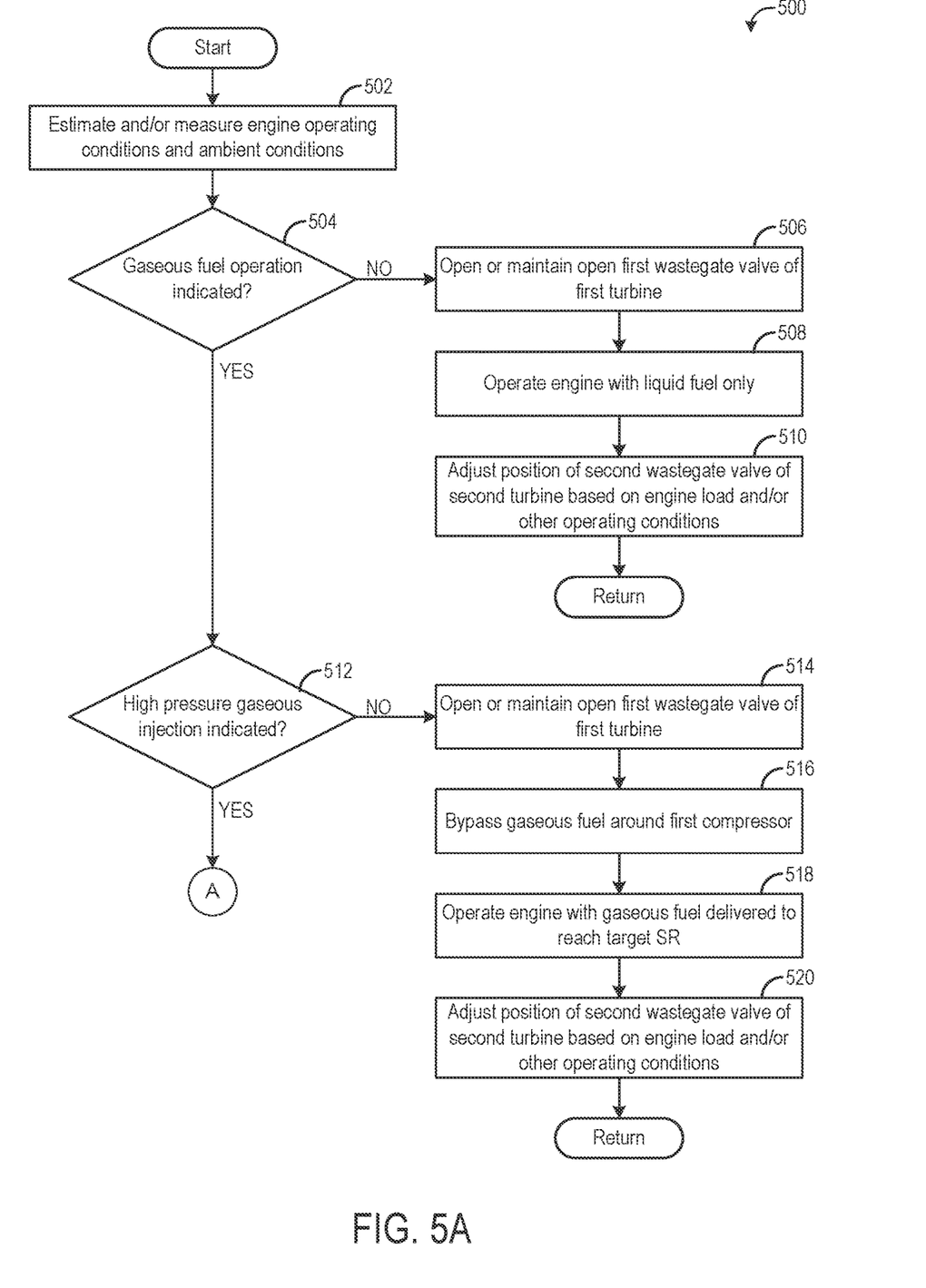
FIGS. 5A and 5B show a flow chart illustrating a method for operating an engine with gaseous fuel compressed via a gaseous fuel turbo-compressor.
Figure 5B:
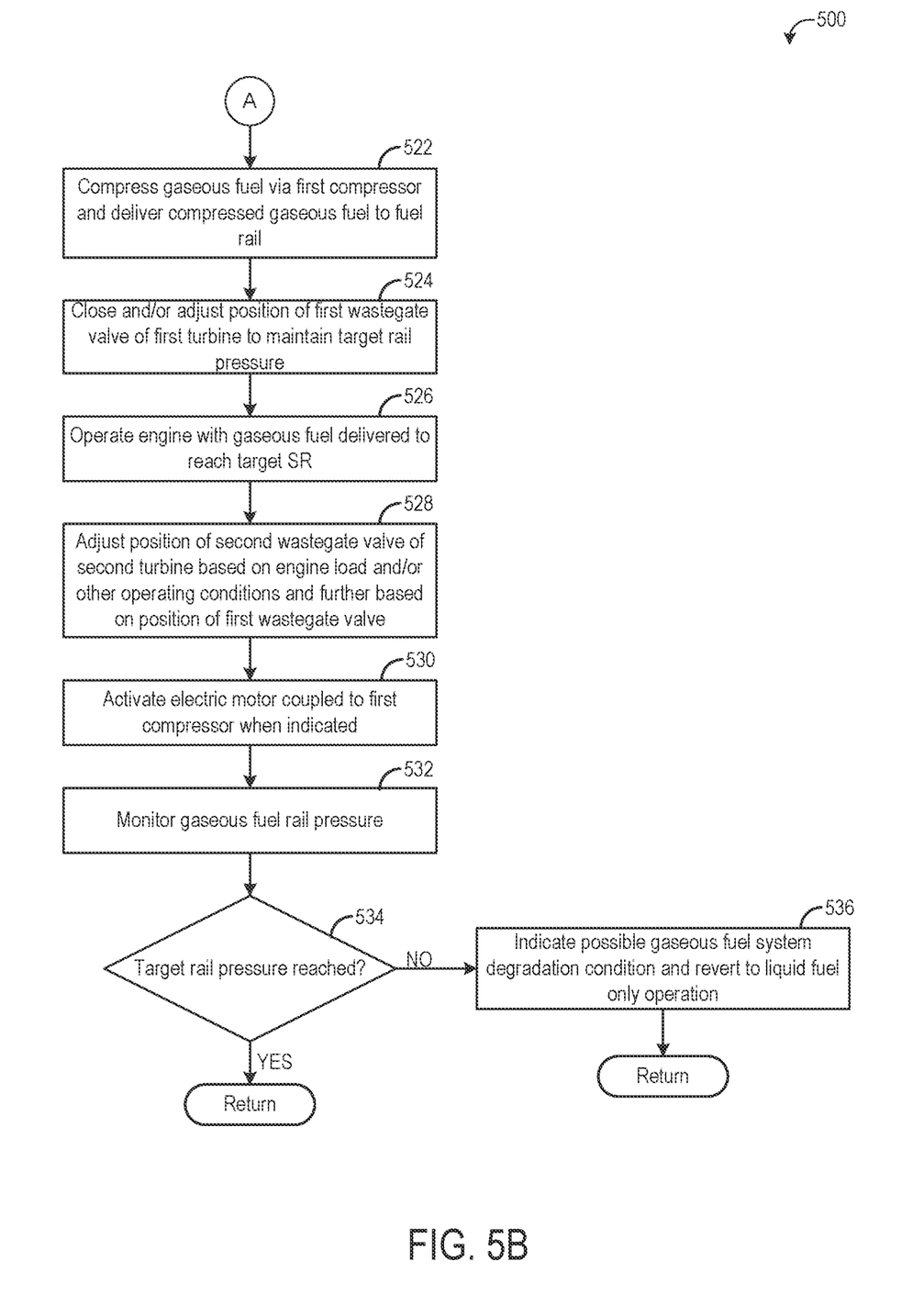

FIGS. 5A and 5B are a flow chart illustrating a method 500 for utilizing power generated by a turbine to compress a gaseous fuel to a threshold pressure. The method may be executed by a controller of a vehicle, such as the controller of FIGS. 1-4, based on instructions stored in a memory of the controller.

At step 502, the method may include determining engine operating parameters and ambient conditions. Vehicle operating parameters and/or conditions may be estimated based on one or more outputs of various sensors of the vehicle (e.g., such as one or more exhaust temperature sensors, an engine speed sensor, a wheel speed and/or a turbo shaft speed sensor, a torque sensor, a manifold pressure sensor, etc., as described above in reference to FIGS. 1-3). Vehicle operating conditions may include engine speed, current AFR, engine load, engine power, turbo speed, injection timing, wastegate positions, vehicle velocity, exhaust gas flow rate, mass airflow rate, coolant temperature, coolant flow rate, engine oil pressures (e.g., oil gallery pressures), manifold air temperature and pressure, cylinder temperatures, operating modes of one or more intake valves and/or one or more exhaust valves, electric motor velocity, battery charge, engine torque output, vehicle wheel torque, and the like. Additionally, ambient conditions may be estimated and/or measured, including barometric pressure, ambient temperature, humidity, and so on.

At step 504, the method may determine if gaseous fuel operation is indicated. Gaseous fuel operation may not be indicated in conditions such as high load conditions (e.g., 75% of maximum rated load or higher), in which it may be advantageous to operate with only liquid fuel to maximize power output, or when gaseous fuel is not available. If gaseous fuel operation is not indicated, the method may proceed to step 506 to open or maintain open the first wastegate valve of the first turbine. As such, exhaust may flow through the first bypass passage and be diverted around the first turbine. In this way, minimal to no waste energy from the exhaust may be utilized to power the first compressor. Instead, more of the waste energy from the exhaust may be used to power the second turbine of the turbocharger. At step 508, the method may include operating the engine with liquid fuel only. Operating the engine with liquid fuel only may include injecting, via a second plurality of direct fuel injectors, liquid fuel directly into each operating cylinder of the engine. At step 510, the method may include adjusting the position of the second wastegate valve of the second turbine based on the engine load and/or other operating conditions (such as intake manifold pressure, commanded EGR rate, and/or a position of the EGR valve). As the second wastegate valve becomes more closed, the amount of exhaust that flows through the second turbine may increase, as well as boost pressure of the engine.

In some examples, the first turbine may be utilized to adjust a backpressure of the exhaust, which may reduce throttling of the donor cylinders and facilitate more efficient and accurate EGR delivery. Accordingly, in some examples, the position of the first wastegate valve may be adjusted (e.g., to a partially or fully closed position) based on a commanded EGR rate, position of the EGR valve, engine load, and/or other parameters to reach a target exhaust pressure and/or the commanded EGR rate, even when gaseous fuel delivery is not enabled. In such examples, the first turbine may be used to generate electrical energy (e.g., when the first turbine is coupled to a generator), drive auxiliary loads, etc.

If gaseous fuel operation is indicated at step 504, the method may proceed to step 512. At step 512, the method may determine if high-pressure gaseous injection is indicated. In some examples, such as low load conditions, the pressure in the engine cylinders may be low enough that high-pressure fuel injection is not demanded and the engine may be operated with low-pressure gaseous fuel (e.g., lower than a direct injection threshold pressure, which may be 100 bar/10,000 kPa in some examples). If high-pressure gaseous injection is not indicated, the method may proceed to step 514 to open or maintain open the first wastegate valve of the first turbine (unless the first turbine is to be used to increase exhaust pressure, as explained above). As such, exhaust may bypass the first turbine and minimal to no waste energy may be utilized to power the first compressor. At step 516, the method may include bypassing gaseous fuel around the first compressor. The compressor bypass valve may be opened so that gaseous fuel may bypass the first compressor.

At step 518, the method may include operating the engine with gaseous fuel delivered to reach a target substitution ratio (SR). In some examples, the target SR may be reached by controlling the amount of gaseous fuel delivered to the engine through adjusting the compressor bypass valve and/or inlet metering valve. Further, the target SR may be reached by controlling the amount of liquid fuel delivered to the engine. The target SR may be estimated based on variables such as the current engine operating point (e.g., load and speed), ambient temperature, and ambient pressure. For example, look-up tables or maps may be stored in the controller's memory providing substitution ratios according to different values of the variables. At step 520, the method may include adjusting the position of the second wastegate valve of the second turbine based on the engine load and/or other operating conditions. In some examples, the engine load/other operating conditions may include the current SR, the position of the EGR valve, the commanded EGR rate, and the amount of waste energy in the exhaust (e.g., exhaust temperature and pressure).

If high-pressure gaseous injection is indicated at step 512, the method may proceed to step 522 (shown in FIG. 5B) to compress gaseous fuel via the first compressor and to deliver the compressed gaseous fuel to the gaseous fuel rail. After being compressed, the gaseous fuel may flow through a pressure regulator and cooler before reaching the gaseous fuel rail. As such, gaseous fuel that is at too high of a pressure may be diverted back upstream of the first compressor and lowered in pressure. Gaseous fuel may be cooled to a temperature suitable for fuel injection into the engine before the fuel reaches the gaseous fuel rail. At step 524, the method may include closing and/or adjusting the position of the first wastegate valve of the first turbine to maintain a target gaseous fuel rail pressure. The target gaseous fuel rail pressure may be the direct injection threshold pressure, which may enable the gaseous fuel to be injected directly into the cylinders of the engine during the compression stroke, for example. In some examples, the target gaseous fuel rail pressure may be equal to or above 100 bar/10,000 kPa, at least in some examples. In some examples, the first wastegate valve may be completely closed and all of the exhaust may flow through the first turbine. As such, more power may be delivered to the first compressor and the gaseous fuel may be compressed to a higher pressure. In other examples, the first wastegate valve may be partially closed and only a subset of the exhaust may flow through the first turbine. In some examples, the position of the first wastegate valve may be further adjusted based on the position of the EGR valve. For example, if the EGR valve is in a more open position (and a first, higher amount of exhaust gas is diverted back to the engine), the first wastegate valve may be adjusted to be in a more closed position relative to a less closed position of the first wastegate valve when the EGR valve is in a less open position (and a second, lower amount of exhaust gas is diverted back to the engine).

At step 526, method 500 includes operating the engine with gaseous fuel delivered to reach the target SR. The gaseous fuel may be injected directly into each active/operating cylinder via a respective direct injection coupled to the gaseous fuel rail. The amount of gaseous fuel injected to each cylinder may be controlled by controlling the injection duration of each direct injector. In some examples, the target SR may be reached by controlling the amount of liquid fuel delivered to the engine. The liquid fuel may be delivered in an amount to reach the target SR via direct injectors coupled to a liquid fuel rail, which may inject the liquid fuel directly into the active/operating cylinders.

At step 528, the method may include adjusting the position of the second wastegate valve of the second turbine based on engine load and/or other operating conditions and further based on the position of the first wastegate valve. As exhaust passes through the first turbine, which is upstream of the second turbine in the exhaust passage, energy in the exhaust may be used to power the first turbine. In this way, the amount of energy in the exhaust when the exhaust reaches the second turbine may be reduced. The position of the first wastegate may determine the amount of exhaust that flows through the first turbine, and therefore may determine the amount of energy remaining in the exhaust when the exhaust reaches the second turbine. In some examples, the first wastegate may be more closed to direct more of the exhaust through the first turbine. As such, the energy of the exhaust may be reduced by a greater amount and the second wastegate may be adjusted to a more closed position to direct more exhaust through the second turbine relative to if the turbo-compressor was not active and exhaust was bypassing the first turbine (e.g., for the same speed-load point).

At step 530, the method may include activating the electric motor coupled to the first compressor when indicated. In some examples, the first compressor may demand more power than is being generated by the first turbine to compress the gaseous fuel to the target pressure. As such, the electric motor may be activated in order to provide additional power to the first compressor. The electric motor may be activated responsive to engine load (e.g., the electric motor may be activated when engine load is below a threshold load and when high-pressure gaseous fuel injection is indicated) in some examples and/or responsive to commanded EGR rate/EGR valve position (e.g., the electric motor may be activated when insufficient exhaust gas is available to drive the first turbine due to a relatively high amount of exhaust gas being diverted back to the engine). Additionally or alternatively, the electric motor may be activated in response to gaseous fuel rail pressure, such as in response to the gaseous fuel rail pressure being below the target gaseous fuel rail pressure. The electric motor may be activated by supplying electricity to the electric motor (e.g., from an energy storage device such as a battery or from an electrical producer, such as an alternator/generator). Further, the load of the electric motor may be adjusted to adjust the speed of the electric motor. The load of the electric motor may be adjusted by adjusting the amount of electricity supplied to the electric motor, which may include adjusting the electrical load on the supplier of the electricity (e.g., a generator coupled to the electric motor). At step 532, the method may include monitoring the gaseous fuel rail pressure. The gaseous fuel rail pressure may be monitored based on output from the fuel rail pressure sensor. In some examples, if the output from the gaseous fuel rail pressure sensor indicates that the pressure of the gaseous fuel in the gaseous fuel rail is lower than the target pressure, the first wastegate valve may be adjusted so that the first compressor may receive more power from the first turbine and/or the electric motor may be activated in order to increase the pressure of the gaseous fuel being delivered to the fuel rail. At step 534, method may determine if the target fuel rail pressure has been reached. If the target fuel rail pressure has not been reached (e.g., even as the electric motor is activated and/or the first wastegate valve is adjusted), the method may proceed to step 536 to indicate a possible gaseous fuel system degradation condition and to revert to liquid fuel only operation. In some examples, a possible gaseous fuel system condition may include a leak in an intermediate tubing or the degradation of one of the system components (e.g., the first turbine, the first compressor, the fuel rail). If a degradation condition is indicated, an operator may be notified (e.g., via an indicator lamp) and/or a diagnostic code may be stored.

The disclosure describes a system that includes a turbine positioned in an exhaust passage of an engine, and a compressor coupled to the turbine and positioned in a gaseous fuel line upstream of the engine. In a first example of the system, the gaseous fuel line is coupled to a gaseous fuel tank that can store gaseous fuel at a first pressure and the compressor is operable to increase a pressure of the gaseous fuel in the gaseous fuel line to a second pressure, higher than the first pressure. In a second example of the system, optionally including the first example, the gaseous fuel may be one or more of ammonia, syn-gas, natural gas, hydrogen, or combinations thereof. In a third example of the system, optionally including one or both of the first and second examples, the gaseous fuel line is coupled to one or more gaseous fuel injectors of the engine each that can inject the gaseous fuel directly to a respective cylinder of the engine. In a fourth example of the system, optionally including one or more or each of the first through third examples, the system may include a cooler positioned in the gaseous fuel line intermediate the compressor and the engine or positioned upstream of both the compressor and the engine. In some examples, the cooler may be positioned immediately upstream of the compressor or the engine, such that no intervening components are present between the cooler and the compressor (or the engine). In a fifth example of the system, optionally including one or more or each of the first through fourth examples, the system may include a pressure regulator positioned in the gaseous fuel line intermediate the compressor and the engine. In a sixth example of the system, optionally including one or more or each of the first through fifth examples, the system may include an electric motor coupled to the compressor. In a seventh example of the system, optionally including one or more or each of the first through sixth examples, the turbine is a first turbine and the compressor is a first compressor, and may include a second turbine positioned in the exhaust passage, downstream of the first turbine, the second turbine coupled to a second compressor positioned in an intake passage of the engine.

The disclosure describes a system that includes a turbine positioned in an exhaust passage of an engine, a wastegate valve operable to adjust an amount of exhaust gas flowing through the turbine, a compressor coupled to the turbine and positioned in a gaseous fuel line upstream of the engine, the gaseous fuel line can deliver gaseous fuel at or above a direct injection threshold pressure to a plurality of gaseous fuel injectors of the engine, each gaseous fuel injector that can inject the gaseous fuel directly into a respective cylinder of the engine, a fuel storage tank that can store gaseous fuel at a pressure lower than the direct injection threshold pressure, the fuel storage tank fluidly coupled to the gaseous fuel line, and a controller that can respond to a gaseous fuel pressure measurement downstream of the compressor by one or both of: adjusting a position of the wastegate valve and activating an electric motor coupled to the compressor. In a first example of the system, the turbine is a first turbine and the compressor is a first compressor, and may include a second turbine positioned in the exhaust passage, downstream of the first turbine, the second turbine coupled to a second compressor positioned in an intake passage of the engine. In a second example of the system, optionally including the first example, the wastegate valve is a first wastegate valve and with a second wastegate valve operable to adjust an amount of exhaust gas flowing through the second turbine. The controller can adjust a position of the second wastegate valve based on engine load and further based on a position of the first wastegate valve. In a third example of the system, optionally including one or both of the first and second examples, the system may include an electric motor coupled to the compressor. The controller can activate the electric motor in response to an engine load of the engine being below a threshold load. In a fourth example of the system, optionally including one or more or each of the first through third examples, the controller can activate the electric motor in response to an engine speed of the engine being below a threshold speed. In a fifth example of the system, optionally including one or more or each of the first through fourth examples, the engine may include a plurality of liquid fuel injectors each configured to inject liquid fuel directly to a respective cylinder, and the liquid fuel is supplied to the plurality of liquid fuel injectors via a high pressure pump and not via the compressor.

The disclosure describes a method that includes compressing gaseous fuel at a first pressure below a direct injection threshold pressure to a second pressure at or above the direct injection threshold pressure via a compressor positioned in a gaseous fuel line coupled to the fuel storage tank, the compressor being coupled to a turbine that is positioned in an exhaust passage of an engine, and injecting the compressed gaseous fuel at the second pressure into one or more cylinders of the engine. In a first example of the method, the method may include adjusting a position of a wastegate valve coupled around the turbine based at least in part on the second pressure. In a second example of the method, optionally including the first example, the turbine is a first turbine, the compressor is a first compressor, and the wastegate valve is a first wastegate valve, and may include adjusting a position of a second wastegate valve coupled around a second turbine positioned in the exhaust passage, downstream of the first turbine, based at least in part of the position of the first wastegate valve, the second turbine coupled to a second compressor positioned in an intake passage of the engine. In a third example of the method, optionally including one or both of the first and second examples, the method may include pressurizing liquid fuel via a high pressure pump and injecting the pressurized liquid fuel directly into the one or more cylinders of the engine. In a fourth example of the method, optionally including one or more or each of the first through third examples, the method may include supplying electricity to an electric motor that is coupled to the compressor, and thereby to control a speed of the compressor. In a fifth example of the method, optionally including one or more or each of the first through fourth examples, the method may include supplying an electrical load to an electric motor that is coupled to the compressor, and thereby to control a speed of the compressor.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated. This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other embodiments that occur to those of ordinary skill in the art. Such other embodiments are intended to be within the scope of the claims if they have structural elements that do not differ from the literal language of the claims, or if they include equivalent structural elements with insubstantial differences from the literal languages of the claims.

The invention claimed is:

1. A system, comprising:
   a first turbine positioned in an exhaust passage of an engine;
   a second turbine positioned downstream of the first turbine in the exhaust passage;
   a first compressor coupled to the first turbine and positioned in a gaseous fuel line upstream of the engine; and
   a second compressor coupled to the second turbine and positioned in an intake passage of the engine.

2. The system of claim 1, wherein the gaseous fuel line is coupled to a gaseous fuel tank configured to store gaseous fuel at a first pressure and the compressor is operable to increase a pressure of the gaseous fuel in the gaseous fuel line to a second pressure, higher than the first pressure.

3. The system of claim 2, wherein the gaseous fuel comprises at least one of ammonia, syn-gas, natural gas, hydrogen, or combinations thereof.

4. The system of claim 2, wherein the gaseous fuel line is coupled to one or more gaseous fuel injectors of the engine each configured to inject the gaseous fuel directly to a respective cylinder of the engine.

5. The system of claim 2, further comprising a cooler positioned in the gaseous fuel line immediately upstream of the compressor and the engine.

6. The system of claim 2, further comprising a pressure regulator positioned in the gaseous fuel line intermediate the compressor and the engine.

7. The system of claim 1, further comprising an electric motor coupled to the compressor.

8. A system, comprising:
a first turbine positioned upstream from a second turbine in an exhaust passage of an engine;
a wastegate valve operable to adjust an amount of exhaust gas flowing through the turbine;
a first compressor coupled to the first turbine and positioned in a gaseous fuel line upstream of the engine, the gaseous fuel line configured to deliver gaseous fuel at or above a direct injection threshold pressure to a plurality of gaseous fuel injectors of the engine, each gaseous fuel injector configured to inject the gaseous fuel directly into a respective cylinder of the engine;
a second compressor coupled to the second turbine and positioned in an intake passage of the engine;
a fuel storage tank configured to store gaseous fuel at a pressure lower than the direct injection threshold pressure, the fuel storage tank fluidly coupled to the gaseous fuel line; and
a controller configured to respond to a gaseous fuel pressure measurement downstream of the first compressor by one or both of: adjusting a position of the wastegate valve and activating an electric motor coupled to the first compressor.

9. The system of claim 8, wherein the wastegate valve is a first wastegate valve, the system further comprising a second wastegate valve operable to adjust an amount of exhaust gas flowing through the second turbine, and wherein the controller is configured to adjust a position of the second wastegate valve based on engine load and further based on a position of the first wastegate valve.

10. The system of claim 8, wherein the controller is configured to activate the electric motor in response to an engine load of the engine being below a threshold load.

11. The system of claim 8, wherein the controller is configured to activate the electric motor in response to an engine speed of the engine being below a threshold speed.

12. The system of claim 8, wherein the engine further includes a plurality of liquid fuel injectors each configured to inject liquid fuel directly to a respective cylinder, and the liquid fuel is supplied to the plurality of liquid fuel injectors via a high pressure pump and not via the compressor.

13. A method, comprising:
compressing gaseous fuel at a first pressure below a direct injection threshold pressure to a second pressure at or above the direct injection threshold pressure via a first compressor positioned in a gaseous fuel line, the first compressor being coupled to a first turbine that is positioned in an exhaust passage of an engine upstream of a second turbine that is coupled to a second compressor positioned in an intake passage of the engine; and
injecting the compressed gaseous fuel at the second pressure into one or more cylinders of the engine.

14. The method of claim 13, further comprising adjusting a position of a wastegate valve coupled around the first turbine based at least in part on the second pressure.

15. The method of claim 14, wherein the wastegate valve is a first wastegate valve, the method further comprising adjusting a position of a second wastegate valve coupled around the second turbine positioned in the exhaust passage, downstream of the first turbine, based at least in part of the position of the first wastegate valve.

16. The method of claim 13, further comprising pressurizing liquid fuel via a high pressure pump and injecting the pressurized liquid fuel directly into the one or more cylinders of the engine.

17. The method of claim 13, further comprising supplying electricity to an electric motor that is coupled to the compressor, and thereby to control a speed of the compressor.

18. The method of claim 13, further comprising supplying an electrical load to an electric motor that is coupled to the compressor, and thereby to control a speed of the compressor.

* * * * *